Patented Aug. 16, 1932

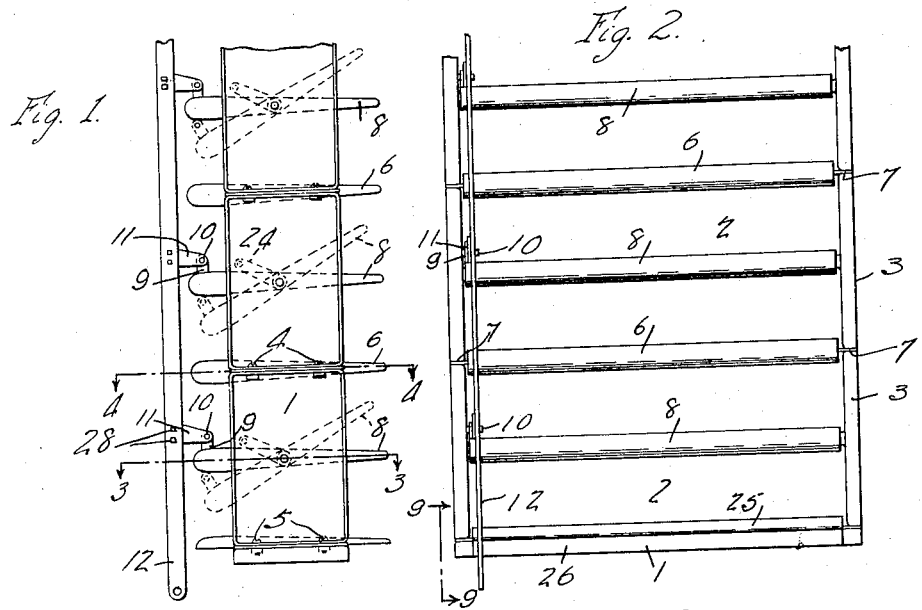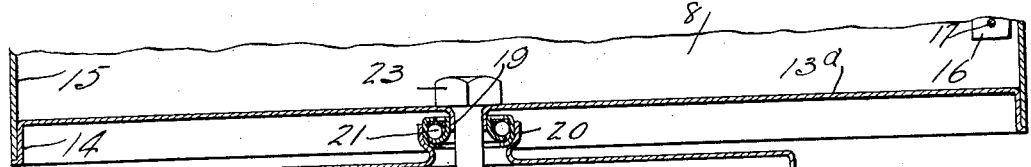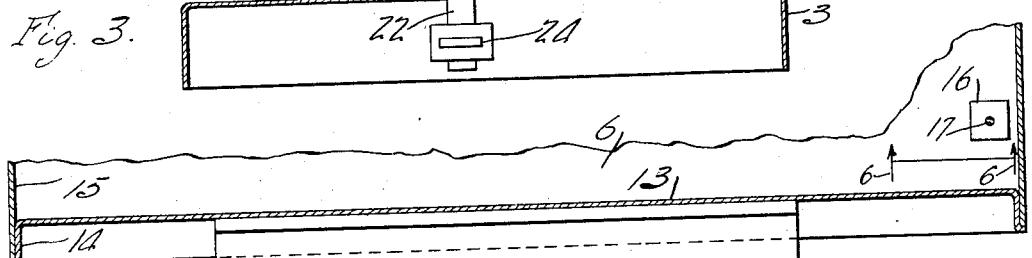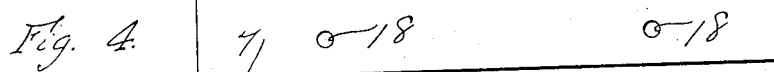

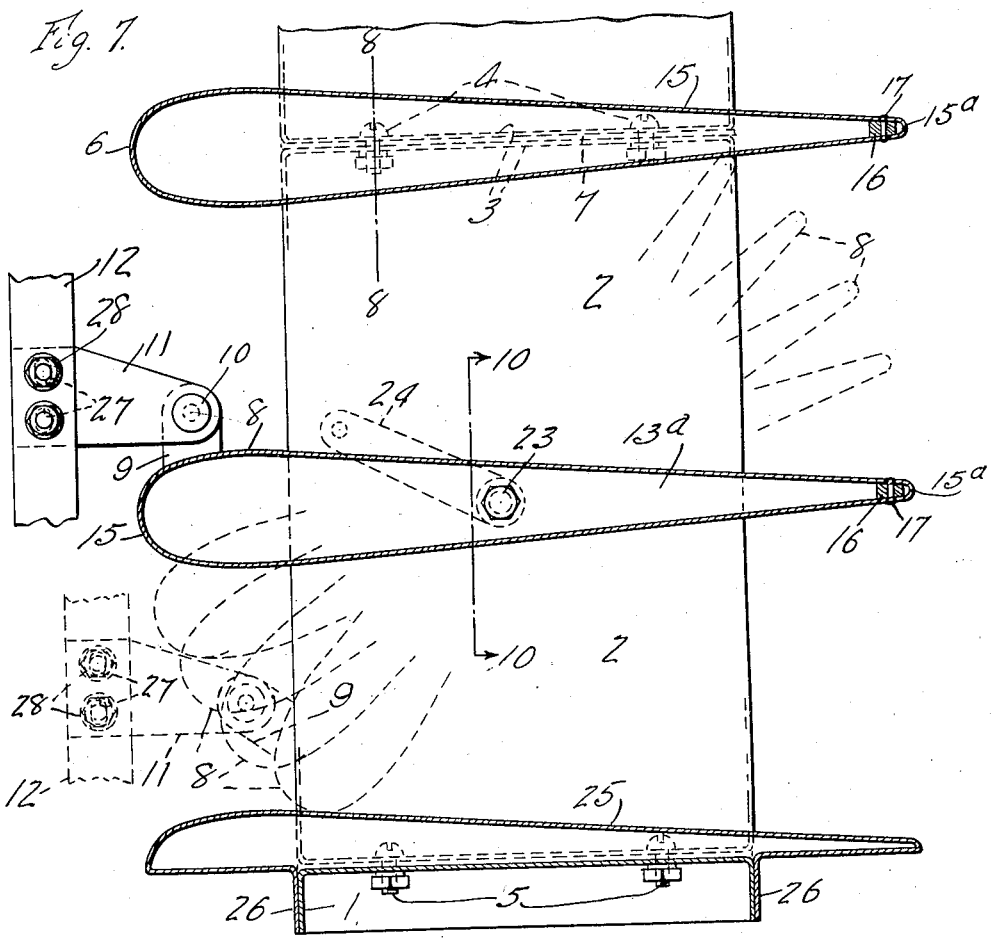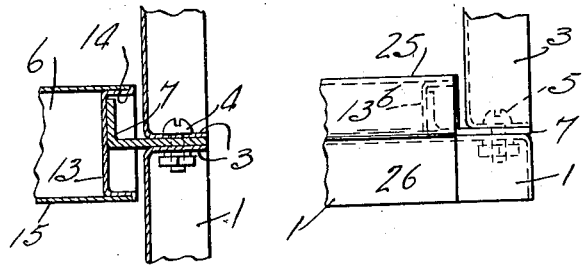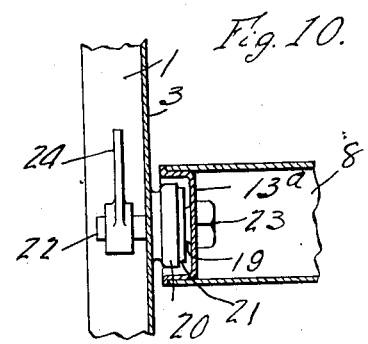

1,872,599

UNITED STATES PATENT OFFICE

JOSEPH M. LE GRAND, OF NEWARK, NEW JERSEY, ASSIGNOR TO CARRIER ENGINEERING CORPORATION, OF NEWARK, NEW JERSEY

LOUVER OR DAMPER DEVICE

Application filed February 25, 1928. Serial No. 257,039.

This invention relates to louver or damper devices and more particularly to those adapted for use in openings or passages through which a fluid flow occurs. Such louver or damper devices are commonly employed for controlling to variable extents the fluid flow through passages, as for example, in air conditioning and ventilating devices. The usual types of louver or damper devices heretofore employed offer considerable resistance to the passage of a fluid therethrough, and all of the louvers or vanes thereof were adjustable and usually connected to a common operating member, so that when the vanes were operated to partially close an opening or passage, the fluid allowed to pass through the louver or damper device would be discharged or diverted in different directions, depending upon the angular positions of the vanes or louvers. Where different gases or different bodies of air having different atmospheric conditions were admitted to a common chamber through different louver or damper devices for common mixing, the currents of air or gases in entering the common chamber were often directed in different directions into the chamber, and consequently a thorough mixing did not always occur, and stratification was frequent.

An object of this invention is to generally improve louver devices, and to reduce the resistance to fluid flow therethrough.

Another object of the invention is to provide an improved louver or damper device with which a minimum of power will be required for conducting a fluid through a passage controlled thereby, and with which given quantities of fluid may be conducted through openings of smaller sizes with the same power.

A further object of the invention is to provide an improved louver or damper device for variably controlling fluid flow through a passage; with which equal linear increments of adjustment of the louvers or dampers will produce approximately equal variations in the effective open space through which fluid is conducted; with which the fluid passing through the device will always be discharged in approximately the same direction regardless of the position of the movable parts of the device, and with which the number of moving parts for effectively controlling a passage will be reduced.

A further object of the invention is to provide an improved louver or damper device which may be built up of standard units and parts to produce devices of different sizes, and which will be relatively simple, durable, efficient and inexpensive.

Various other objects and advantages will be apparent from the following description of an embodiment of the invention, and the novel features will be particularly pointed out hereinafter in connection with the appended claims.

In the accompanying drawings:

Fig. 1 is a side elevation of a portion of a louver or damper device constructed in accordance with this invention.

Fig. 2 is a front elevation of the same.

Fig. 3 is a sectional plan of a portion of the same but on a somewhat larger scale, the section being taken approximately along the line 3—3, Fig. 1.

Fig. 4 is a sectional plan through another portion of the device, with the section taken approximately along the line 4—4, Fig. 1.

Fig. 5 is an end elevation of the fixed vane of Fig. 4.

Fig. 6 is a sectional elevation of a portion of the same, the section being taken approximately along the line 6—6, Fig. 4.

Fig. 7 is a transverse, sectional elevation of the lower part of a device constructed in accordance with this invention.

Fig. 8 is a sectional elevation through a portion of the device, with the section taken approximately along the line 8—8, Fig. 7.

Fig. 9 is a front elevation of one of the lower corners of the frame, the view being taken from approximately the line 9—9, Fig. 2.

Fig. 10 is a sectional elevation through a part of the device, the section being taken approximately along the line 10—10, Fig. 7.

In the illustrated embodiment of the invention, the device includes a frame or structure 1 defining or enclosing a passage 2 through which air or other fluid is to be drawn or conducted. The sides of the structure or frame 1 may be formed of units or sections 3 abutting end to end and interposed between the top and bottom parts of the frame 1. The units 3 and top and bottom parts of the frame 1 are each preferably somewhat channel shaped in cross section, with flanges at the ends of the channels, as shown clearly in Figs. 1 and 2. The abutting ends of the units or sections 3 of the side members may be secured together through their abutting flanges in any suitable manner, such as by screws or bolts 4. The ends of the side members may be similarly secured, such as by screws 5, to the top and bottom members of the frame 1.

A plurality of fixed vanes 6 are disposed across the passage 2 between the side members of the frame, and each vane may have a flange 7 projecting from its ends, which flanges 7 are interposed between abutting ends of the units or sections 3 of the side members, and clamped therebetween by the screws 4. The size of the louver or damper device may thus be varied by increasing or decreasing the number of units or sections 3 of which the sides of the frame are formed. Each fixed vane 6 in turn subdivides the main passage 2 into a plurality of subpassages. A plurality of adjustable or movable vanes 8 are interposed between the fixed vanes 6, and between the fixed vanes and the top and bottom of the frame, so as to control the subpassages formed by the fixed vanes.

The fixed vanes 6 are disposed edgewise to the direction of fluid flow through the frame, and the movable vanes 8 are also disposed edgewise to the direction of fluid flow through the frame when in open position and permitting maximum flow through the frame. Each movable vane 8 may have a lug or ear 9 extending from the forward portion thereof, Figs. 1 and 7, and these lugs or ears 9 are pivotally connected by pins 10 to arms or brackets 11 extending laterally from a common operating rod or member 12. Suitable operating means, not shown, may be connected to the common operating rod or member 12 for imparting endwise movements to the member 12, and during such endwise movements, the movable vanes 8 will all be tilted concomitantly into different angular positions across the subpassages in which they are disposed, one of which positions is shown by dash lines in Fig. 1.

Each fixed vane 6 may have a pair of end elements or plates 13, Figs. 4, 5 and 8, which are elongated in shape and each provided with a peripheral flange 14. The periphery of each element 13 is stream line in shape, that is, has a rounded, somewhat blunt nose, and sides tapering toward the opposite or rear end. A sheet or plate 15 of suitable material, such as sheet metal, is bent or formed about the peripheries of the elements 13, with the elements disposed along opposite edges of the sheet 15, and these sides of the sheets are secured in any suitable manner, such as by soldering or welding, to the flanges 14 along the peripheries of the elements 13. The ends of the sheet 15 may be brought together in a seam 15a at the smaller ends of the elements 13, as shown in Fig. 7.

The abutting ends of the sheet 15 may be secured together, such as by welding or soldering, and suitable spacers or washers may be interposed between opposite stretches of the sheet 15 adjacent the smaller or tapered end of the vane, so as to space apart opposite faces of the vane, as shown clearly in Fig. 6. Suitable rivets 17 may be passed through the opposite stretches of the plate 15 and the spacers or washers 16 so as to firmly unite the abutting ends of the plate and to hold the washers or spacers 16 against displacement. The opposite faces of the spacers 16 will be tapered to correspond with the taper in the small ends of the vanes.

To the outer face of each end element 13 of each fixed vane, a mounting flange 7 is secured. This flange 7 may be an angle strip having one arm or leg thereof abutting against the outer face of an element 13, and secured thereto such as by welding or riveting. Each flange 7 may have openings or apertures 18 therethrough for the passage of the screws or bolts 4.

Each movable vane 8 is formed similarly to the fixed vane, except that each end element 13a which corresponds to the element 13 has a tubular extension or flange 19 drawn or punched outwardly therefrom, Fig. 3. The units 3 forming the side members of the frame 1, midway of their ends are punched outwardly or otherwise drawn or formed to provide tubular bearing extensions 20 which telescope in spaced relation to the tubular extensions 19 of the movable vanes. A suitable anti-friction bearing device 21, such as a ball bearing unit, may be interposed between the telescoping extensions 19 and 20 to complete a pivotal mounting between each movable vane and the frame units 3.

In some cases it may be desirable to operate the movable vanes through their pivots or bearings, and for this purpose a bolt or rod 22 may be disposed within and fit one or both of the tubular extensions 19, with the head 23 of the bolt or rod abutting against the inner face of the end element 13a through which the rod passes. The bolt or rod head 23 may be secured to the end element 13a in any suitable manner, such as by welding, and thus will serve as a reinforcement for the tubular extension 19, and the shank of the bolt or rod 22 will extend outwardly through a side or unit 3 of the frame. The outer end of each bolt or rod 22 may carry an arm 24 by which it may be operated.

The arms 24 of all of the movable vanes may, if desired, be connected together by a common operating rod similar to the operating rod 12.

Fixed end vanes 25 are fitted over the inner faces of the top and bottom members of the frame. For example, each end vane 25 may have a convex stream line face which extends into the passage 2 slightly, as shown in Figs. 1, 2 and 7, the forward and rearward edges of the plate of which the vane is formed being bent toward one another, and then flanged at right angles, as at 26, to fit along the side edges of the top and bottom frame members. The flanges 26 are secured to the frame in any suitable manner. The stream line shaped stretch of the plate forming the vane 25 may be spaced or held in its shape by end elements 13b, somewhat similar to the elements 13, except that each element 13b corresponds only to a half of an element 13, but its convex periphery is flanged along the projecting portions of the vane, as shown in Fig. 9. The flange of the element 13b is secured to the stream line portion of the vane 25 in any suitable manner, and a flange 7, similar to the flanges 7 for the other fixed vanes, has one arm thereof fitted against and secured to each of the end elements 13b, with its other arm projecting therefrom and disposed between the top and bottom members of the frame and the adjacent side unit 3, as shown in Fig. 9. The flange 7 for the end vanes 25 may have openings therein through which the clamping screws or bolts 5 may pass.

In order to provide for a limited relative adjustment of the movable or pivoted vanes 8, the common operating rod or member 12 may have slots 27 elongated lengthwise thereof for receiving bolts 28, by which the brackets or arms 11 are secured thereto. By first loosening the bolts 28, the brackets or arms 11 may be adjusted lengthwise of the common operating rod 12 to a limited extent so as to enable a preliminary, accurate and individual adjustment or setting of the movable vanes 8.

In the use of the louver or damper device constructed as hereindescribed and illustrated, the assembly may include as many units 3 of the side members of the frame as necessary to provide a passage 2 of the desired size. The fixed vanes 6 will be interposed between the units 3, and the end vanes 25 will be mounted at the top and bottom of the frame 1, with their stream line faces projecting into the passage 2, as indicated clearly in Fig. 7. The movable vanes associated with each unit 3 will be connected together and to the common operating rod or member 12, which may in turn be operated by suitable control means, such as by an automatically controlled air motor, not shown. The vanes are all disposed with their broader or thicker edges forwardly, and the surfaces presented by all of the vanes will be stream line surfaces, i. e., of stream line shape in transverse cross section, thus offering a minimum of resistance to fluid flow past the same and through the passage 2.

It will be noted that by reason of the stream line surfaces of the vanes, the surfaces of two adjacent vanes facing one another will be curved convexly toward one another so as to produce first a convergence or restriction in the passage between them, and then a gradual divergence toward the rear edge. Such a passage is somewhat Venturi-like, and it is kown that a Venturi passage offers a minimum of resistance to fluid flow therethrough. By reason of the curved noses at the forward edges of the vanes, it will be observed that this Venturi-like passage will be continued during oscillations of the movable vanes, even though the vanes are adjusted to different positions at considerable angles to the direction of flow, such as shown by dash lines in Figs. 1 and 7. It will be noted further that because of the stream line surfaces of the vanes, the effective openings between the ends of adjacent vanes will be varied approximately equally with equal linear increments of movement of the common operating rod or member 12.

A plurality of different angular positions of a movable vane 8 are illustrated by dash lines, Fig. 7, and it will be observed that at both the front and rear edges of the movable vane, the distance between it and the corresponding edge of the adjacent fixed vane will vary by equal increments for equal increments of movement of the operating rod 12. This will be true at both front and rear edges of each movable vane, with the possible exception of movements through positions closely approximating straight out or open positions of the movable vane, shown by full lines in Fig. 7. Thus, for a considerable portion of the range of adjustment of the movable vane 8, the variations in the openings between the front and rear edges of the movable vane and the adjacent portions of the fixed vanes will be proportional to the increments of vertical movements of the control rod or member 12. This is a very important feature where the rod 12 is actuated by a motor under the automatic control of suitable instruments such as thermostats and hygrostats.

It will be further observed that the air passing through the louver or damper device will leave it in approximately a horizontal direction, that is in the same direction of flow, regardless of whether or not the movable vanes are tilted considerably across the direction of flow, or are in straight-out positions parallel to the flow, and thus in any constructions where a change in direction of flow is not desired, this louver or damper device will be particularly valuable. All of the parts may be made of sheet metal and assembled to provide devices of different sizes by the use of the same standard parts. While the invention has been described to some extent as particularly useful for ventilation and air conditioning systems, it will be understood that this reference to those devices is for the purpose of explaining some of the advantages of the invention and it is not to be considered as a limitation of the scope of the invention.

It will be obvious that various changes in the details which have been hereindescribed and illustrated in order to explain the nature of the invention may be made by those skilled in the art within the principle and scope of the invention as expressed in the appended claims.

I claim as my invention:

1. A louver or damper device comprising a frame having a passage therethrough, the side members of said frame being formed of units abutting and connected to one another, a fixed vane disposed across said passage between said side members and mounted at its ends between connected units, and a movable vane disposed across said passage at each side of said fixed vane and adjustable to close and open the portion of said passage at each side of said fixed vane, all of said vanes being spaced from one another and disposed edgewise to the direction of flow through said passage.

2. A louver or damper device comprising a frame having a passage therethrough, the side members of said frame being formed of units abutting and connected to one another, a fixed vane disposed across said passage between said side members and mounted at its ends between connected units, and a movable vane disposed across said passage at each side of said fixed vane and adjustable to close and open the portion of said passage at each side of said fixed vane, all of said vanes being spaced from one another and the end members of the frame, and disposed edgewise to the direction of flow through said passage, and having stream line faces exposed to the fluid flow in said passage.

3. In a louver or damper device, a vane comprising a pair of elongated end members having their peripheries of stream line shape, with lateral flanges along said peripheries, a flexible plate bent around and secured to the peripheries of said elongated end members at the flanges whereby said plate will present a stream line surface to a fluid passing edgewise thereof.

4. A louver or damper device comprising a frame having a passage therethrough, said frame comprising top and bottom members and a plurality of side units abutting end to end and connected to one another to form side members interposed between and connected to said top and bottom members, vanes disposed across said passage edgewise to the fluid flow therethrough and secured between abutting ends of said units, additional vanes secured over the inside faces of said top and bottom members, and adjustable vanes disposed across said passage and between and mounted on said units for adjustment angularly to said fixed vanes to obstruct variably said passage, all of said vanes having stream line surfaces exposed to said fluid flow.

5. A louver or damper device comprising a frame having a passage therethrough, said frame comprising top and bottom members and a plurality of side units abutting end to end and connected to one another to form side members interposed between and connected to said top and bottom members, vanes disposed across said passage edgewise to the fluid flow therethrough and secured between abutting ends of said units, additional vanes secured over the inside faces of said top and bottom members, adjustable vanes disposed across said passage and between and mounted on said units, each adjustable vane being pivoted upon a lengthwise axis located well interiorly between its front and rear edges for adjustment angularly to said fixed vanes to obstruct variably said passage, all of said vanes having stream line surfaces exposed to said fluid flow, each adjustable vane being spaced from the fixed vanes and having a width greater than the distance between the fixed vanes between which it is interposed, whereby said passage may be closed or opened by adjustment of said adjustable vanes.

6. In a louver or damper device comprising a frame having a passage therethrough, two opposite members of said frame having their inner faces of stream line formation relative to the direction of flow through said passage, said stream line faces forming between them a Venturi channel, and a vane disposed across said passage and having stream line surfaces relatively to the direction of flow through said passage when said vane is disposed edgewise to said flow, so as to subdivide said passage into smaller Venturi channels, said vane being adjustable about a longitudinal axis located intermediate its front and rear edges, whereby when said vane is tilted about its axis angularly to the direction of flow, it may engage at both its front and rear edges with the inner faces of said members and obstruct the passage through said frame.

7. A louver or damper device comprising a frame having a passage therethrough, two opposite members of said frame having their inner faces of stream line formation relatively to the direction of flow through said passage, said stream line faces forming between them a Venturi channel, a vane disposed across said passage and having stream line surfaces relatively to the direction of flow through said passage when said vane is disposed edgewise to said flow, so as to subdivide said passage into smaller Venturi channels, said vane being adjustable about a longitudinal axis located intermediate its front and rear edges, whereby when said vane is tilted about its axis angularly to the direction of flow, it may engage at its front and rear edges with the inner faces of said members and obstruct the passage through said frame, and an operating member connected to said vane and shiftable in a direction transversely of the direction of flow through said passage, whereby when said operating member is given equal increments of movement in a direction transversely of the flow through said passage, said vane will be shifted through increments causing equal variations in the opening between the side edges of the vane and the inner faces of said members for a considerable distance from closed position.

8. A louver or damper device comprising a frame having a passage therethrough, side members of said frame being formed of units abutting and connected to one another, a fixed vane disposed across said passage and mounted at its ends between abutting units, said vane being disposed edgewise to the direction of flow through said passage, and having a stream line surface varying from a curved relatively blunt forward nose to a gradually tapering rear edge.

9. A louver or damper device comprising a frame having a passage therethrough, and a plurality of vanes disposed across said passage and edgewise to the direction of flow therethrough, said vanes having curved convex faces forming between abutting faces Venturi-like passages to decrease the resistance flow therebetween, alternate intermediate vanes being tiltable about their longitudinal axes located intermediate their front and rear edges, and the other vanes being relatively fixed, the front and rear edges of each tiltable vane being rounded, whereby when the movable vanes are tilted angularly across the direction of flow, the restricted passages between the ends of the tilted vanes and the fixed vanes will be somewhat Venturi-like.

10. In a louver or damper device, a vane comprising spaced elements having their peripheries of stream line formation, a sheet bent around the peripheries of said elements, with said elements disposed adjacent opposite edges of said sheet, and with the abutting edges of said sheet at one end of said elements, said sheet and periphery of said elements being interconnected to one another, whereby said elements will space said sheet in a manner to provide stream line exposed surfaces, and an angle strip secured to the outer face of each of said elements and projecting outwardly therefrom and by which said vane may be mounted.

11. In a louver or damper device, a vane comprising spaced elements having their peripheries of stream line formation, a sheet bent around the peripheries of said elements, with said elements disposed adjacent opposite edges of said sheet, and with the abutting edges of said sheet at one end of said elements, said sheet and periphery of said elements being interconnected to one another, whereby said elements will space said sheet in a manner to provide stream line exposed surfaces, an angle strip secured to the outer face of each of said elements and projecting outwardly therefrom and by which said vane may be mounted, and tapered spacing members interposed between opposite stretches of said sheet and secured thereto for coupling the same and holding said opposite stretches in spaced relation to one another.

12. In a louver or damper device, a vane comprising spaced end members with stream line peripheries, a sheet bent around the peripheries of said elements with said elements disposed adjacent opposite edges of said sheet, said sheet and elements being interconnected to one another along the peripheries of said elements, whereby said sheet will have a stream line formation, said end elements being formed of sheet metal and each having a tubular cylindrical flange drawn outwardly at a point intermediate its ends, a frame having metallic members between which said vane is disposed, said members being formed of sheet metal and each having a tubular extension drawn therefrom and extending toward the opposite one of said members, the tubular flanges in said end elements having telescopic relation to said tubular extensions of said frame members, and anti-friction bearing devices interposed between the said telescopic extensions and flanges.

13. In a louver or damper device, a vane comprising spaced end members with stream line peripheries, a sheet bent around the peripheries of said elements with said elements disposed adjacent opposite edges of said sheet, said sheet and elements being interconnected to one another along the peripheries of said elements, whereby said sheet will have a stream line formation, said end elements being formed of sheet metal and each having a tubular cylindrical flange drawn outwardly at a point intermediate its ends, a frame having metallic members between which said vane is disposed, said members being formed of sheet metal and each having a tubular extension drawn therefrom and extending toward the opposite one of said members, the tubular flanges in said end elements having telescopic relation to said tubular extensions of said frame members, anti-friction bearing devices interposed between the said telescopic extensions and flanges, a rod passing through the tubular extension of one of said elements and having a head abutting and secured against the inner face of said element through which it passes, and means mounted on the outer end of said rod by which it and said vane may be oscillated.

14. In a louver or damper device, a frame having a passage therethrough, and an end vane disposed along the inner face of and attached to one of the sides of said frame and having an exposed convex stream line face within said passage.

15. A louver or damper device of the character described having a series of vanes, said vanes being in horizontal parallel position when the damper device is completely open, alternate vanes being pivoted substantially at their centers and the other vanes being fixed in position, all vanes being substantially of the same configuration.

16. In a damper device of the character described, a series of stream line vanes, said vanes being in horizontal parallel position when the device is completely open, some of said vanes being pivoted, the other of the vanes being fixed, all the vanes being substantially of the same configuration in vertical section.

17. A series of vanes in a louver device of the character described, sections through the front and rear edges of said vanes being in parallel position when the louver device is completely open, alternate vanes being pivoted substantially at their centers, the other vanes being fixed, all vanes being substantially of the same configuration in shape and size.

JOSEPH M. LE GRAND.